United States Patent
Hannen

(10) Patent No.: US 10,208,177 B2
(45) Date of Patent: Feb. 19, 2019

(54) FIBER REINFORCED CELLULAR PVC

(71) Applicant: Patwin Plastics, Inc., Linden, NJ (US)

(72) Inventor: Timothy J. Hannen, Linden, NJ (US)

(73) Assignee: Patwin Plastics Inc., Linden, NJ (US)

( * ) Notice: Subject to any disclaimer, the term of this patent is extended or adjusted under 35 U.S.C. 154(b) by 351 days.

(21) Appl. No.: 14/661,401

(22) Filed: Mar. 18, 2015

(65) Prior Publication Data
US 2015/0191575 A1    Jul. 9, 2015

Related U.S. Application Data

(62) Division of application No. 13/740,628, filed on Jan. 14, 2013, now abandoned.
(Continued)

(51) Int. Cl.
| | |
|---|---|
| *B29C 44/32* | (2006.01) |
| *B29C 70/52* | (2006.01) |
| *E04C 2/22* | (2006.01) |
| *E04F 13/18* | (2006.01) |
| *C08J 9/00* | (2006.01) |
| *E04C 2/20* | (2006.01) |
| *B29C 47/00* | (2006.01) |
| *B29C 70/20* | (2006.01) |

(Continued)

(52) U.S. Cl.
CPC ............ *C08J 9/0085* (2013.01); *B29C 44/32* (2013.01); *B29C 47/0042* (2013.01); *B29C 70/20* (2013.01); *B29C 70/52* (2013.01); *C08J 9/0066* (2013.01); *E04C 2/205* (2013.01); *E04C 2/22* (2013.01); *B29K 2027/06* (2013.01); *B29K 2105/106* (2013.01); *B29L 2031/003* (2013.01); *B29L 2031/10* (2013.01); *C08J 2201/03* (2013.01); *C08J 2327/06* (2013.01); *C08J 2467/02* (2013.01); *E04C 5/07* (2013.01); *E04F 13/0864* (2013.01); *E04F 13/18* (2013.01); *Y10T 428/24* (2015.01)

(58) Field of Classification Search
CPC ....... B29B 15/122; B29C 44/24; B29C 44/32; B29C 47/0042; B29C 70/086; B29C 70/16; B29C 70/20; B29C 70/50; B29C 70/52; B29C 70/521; B29C 70/528; B29K 2027/06; B29K 2067/006; B29K 2105/04; B29K 2105/105; B29K 2105/106; B29L 2031/003; B29L 2031/10; C08J 2201/03; C08J 2327/06; E04C 2/205; E04C 2/22; E04F 13/0864; E04F 13/18

See application file for complete search history.

(56) References Cited

U.S. PATENT DOCUMENTS

| | | |
|---|---|---|
| 4,482,589 A | 11/1984 | Widman |
| 5,225,454 A | 7/1993 | Loefgren |

(Continued)

FOREIGN PATENT DOCUMENTS

| | | |
|---|---|---|
| WO | 2008027363 A2 | 3/2008 |
| WO | WO 2011/156693 A2 * | 12/2011 |

OTHER PUBLICATIONS

Martin, J.B., Material Safety Data Sheet, Mar. 2008, 14 pages.
(Continued)

*Primary Examiner* — Michael A Tolin
(74) *Attorney, Agent, or Firm* — Greenberg Traurig, LLP

(57) ABSTRACT

The present invention relates to exterior siding, trim and rigid architectural assemblies for buildings.

15 Claims, 4 Drawing Sheets

Related U.S. Application Data

(60) Provisional application No. 61/585,919, filed on Jan. 12, 2012.

(51) Int. Cl.
  *B29L 31/10* (2006.01)
  *B29L 31/00* (2006.01)
  *B29K 27/06* (2006.01)
  *B29K 105/10* (2006.01)
  *E04C 5/07* (2006.01)
  *E04F 13/08* (2006.01)

(56) References Cited

U.S. PATENT DOCUMENTS

| | | |
|---|---|---|
| 5,264,174 A | 11/1993 | Takei et al. |
| 5,538,784 A | 7/1996 | Subramanian |
| 5,830,395 A | 11/1998 | Vercesi et al. |
| 5,979,135 A | 11/1999 | Reeves |
| 6,003,277 A | 12/1999 | Graham et al. |
| 6,122,877 A | 9/2000 | Hendrickson et al. |
| 6,295,777 B1 * | 10/2001 | Hunter ............... E04F 13/0864 52/311.1 |
| 6,344,268 B1 | 2/2002 | Stucky et al. |
| 6,408,580 B1 | 6/2002 | Jurvis et al. |
| 6,579,605 B2 | 6/2003 | Zehner |
| 6,682,814 B2 | 1/2004 | Hendrickson et al. |
| 7,331,270 B2 | 2/2008 | Booher et al. |
| 7,482,038 B1 | 1/2009 | Loper |
| 7,638,187 B2 | 12/2009 | Nesbitt |
| 7,749,424 B2 | 7/2010 | Sironko et al. |
| 8,053,528 B2 | 11/2011 | Shoemake |
| 2003/0021915 A1 | 1/2003 | Rohatgi |
| 2004/0009338 A1 | 1/2004 | Jo et al. |
| 2004/0048055 A1 | 3/2004 | Branca |
| 2006/0103045 A1 | 5/2006 | O'Brien-Bernini et al. |
| 2006/0234028 A1 | 10/2006 | Pardo |
| 2007/0009688 A1 | 1/2007 | Haque et al. |
| 2007/0078191 A1 | 4/2007 | Guhde et al. |
| 2007/0126142 A1 * | 6/2007 | Zhou ................... B29C 70/521 264/134 |
| 2007/0175570 A1 * | 8/2007 | Jentgens ............ B23D 61/185 156/181 |
| 2008/0182074 A1 | 7/2008 | Pasquale et al. |
| 2008/0193740 A1 * | 8/2008 | Nesbitt ............... B29C 44/0407 428/318.4 |
| 2009/0025917 A1 | 1/2009 | Gauthier et al. |
| 2010/0058691 A1 | 3/2010 | Mannion |
| 2010/0075104 A1 | 3/2010 | Duhennau et al. |
| 2010/0255248 A1 | 10/2010 | Steindl et al. |

OTHER PUBLICATIONS

Enduro tuff Span Catalog Data Guide, published 2002, 2006 and 2009.
Apex Holding Systems, LLC ESR-2806 Evaluation Report, published 2011.
http://www.resolite.com/products/roofingandsiding/1-1-2design.html.
Twintex Co-mingled Glass and Thermoplastic Reinforcements, p. 15.

* cited by examiner

FIBER REINFORCED CELLULAR PVC

This application is a divisional of U.S. patent application Ser. No. 13/740,628, filed Jan. 14, 2013, which claims the benefit of U.S. Provisional Application No. 61/585,919, filed Jan. 12, 2012, the contents of which are incorporated herein by reference in their entirety.

FIELD OF THE INVENTION

The present invention relates to exterior siding, trim and rigid architectural assemblies for buildings.

BACKGROUND

Traditional exterior systems for wood-frame construction homes involve plywood or oriented strandboard (OSB) sheets nailed to wood framing, covered with a vapor barrier, and covered in a siding material such as, for example, wood shingles, wooden clapboard siding, vinyl siding, or fiber-cement composite siding.

Cellular polyvinylchloride ("PVC") materials have been used in the housing industry for trim materials for some time. Cellular PVC is easy to cut, more durable than wood, and does not succumb to rotting. However, cellular PVC is not as rigid as wood, and is more susceptible to temperature-induced expansion and contraction, which limits its applicability for exterior applications such as siding and trim.

Various attempts have been made to improve the suitability of cellular PVC for exterior systems.

For example, U.S. Pat. No. 4,482,589A discloses a self carrying platform of the sandwich type forming a closed goods accommodating space, preferably for refrigerator/freezer trailers, comprising a core (15) and surface layers (16) laminated thereto. The surface layers consist of metal plates and the core of a constructional cellular plastics on PVC-basis.

In another example, U.S. Pat. No. 5,264,174 discloses a process for stably producing a compositely reinforced polypropylene composition having less warpage deformation and good moldability which includes the steps of using an extruder having at least three feed inlets, feeding an organic peroxide and a polypropylene resin selected from (a) a polypropylene modified by grafting an unsaturated organic acid thereonto, (b) a mixture of the resulting modified polypropylene and an unmodified polypropylene, (c) a mixture of an unsaturated organic acid and an unmodified polypropylene or (d) mixtures of the foregoing to the extruder through the first feed inlet of the extruder, feeding the lamellar inorganic filler thereto through the second feed inlet disposed at a position where the resin mixture is sufficiently melted and kneaded, feeding the glass fiber through the third feed inlet, and then melting and kneading these materials.

In another example, U.S. Pat. No. 5,538,784 states "Inorganic fiber-reinforced thermoplastic articles are produced from precisely proportioned feed mixtures of particles of thermoplastic polymer, a polymer modifier and inorganic fiber bundles supplied, under specified conditions, directly to an injection molding apparatus. The articles exhibit exceptionally superior heat deflection temperature compared to articles produced from feeds which are precompounded prior to injection molding."

In another example, U.S. Pat. No. 5,830,395 discloses a process for making a substantially uniform composition of short aramid fibers and polymer wherein the fibers are provided with a significant moisture content to improve handling characteristics and are partially dried and opened by shear forces in an extruder before contact with the polymer in the extruder.

In another example, U.S. Pat. No. 5,979,135 A discloses a siding panel comprising: a vinyl sheet having an upper edge; and a fabric tape affixed to the upper edge of the vinyl sheet, wherein the fabric further comprises: a plurality of longitudinal warp yarns; and at least one weft yarn woven through the warp yarns to form a relatively solid band having two edge and a plurality of loops extending from one edge of the band.

In another example, U.S. Pat. No. 6,003,277 discloses an integrally reinforced lineal building component, comprising in combination: an elongated member having a substantially constant cross-sectional shape extending along substantially the entire length of said building component and comprised of cellular material forming the body and major cross-sectional portion of said building component; and an elongated reinforcement element having a substantially constant cross-sectional shape extending along substantially the entire length of said building component and disposed inside said elongated member and bonded integrally thereto, said reinforcement element having at least two flange-like portions integrally attached and disposed at an angle with respect to one another extending lengthwise of and generally parallel to said elongated member.

In another example, U.S. Pat. No. 6,122,877 discloses a siding assembly for an exterior wall surface of a building made up of a plurality of siding units, said units adapted to be affixed to a building with similar units in overlapping horizontal courses with the units of each course lying in overlapping relation, said building having a support structure, each of said units comprising: a profile made of a composite material including a thermoplastic polymer and a cellulosic fiber, said material comprising about 35-60 parts of fiber and about 45-70 parts of polymer per each 100 parts of said composite material; said unit comprising a main body portion including a front face and a rear face, said front face being exposed on assembly of said siding unit on a building, said front face being convex; an upper portion extending from said main body portion, said upper portion having a plurality of slots, said upper portion including a tongue means; and a groove means sized and configured to mate with said tongue means, wherein said groove means is located behind said main body portion.

In another example, U.S. Pat. No. 6,344,268 B1 discloses foamed polymer-fiber composites, building materials and methods of making such building materials . . . . The composites include about 35-75 wt. % of a polymeric resin, about 25-65 wt. % fiber and have a specific gravity of less than about 1.25 g/cc. The low density is provided by the introduction of a blowing agent or gas into a molten precursor of the composite during thermo forming, such as in an extrusion operation.

In another example, U.S. Pat. No. 6,408,580 B1 discloses a siding strip capable of engaging an adjacent siding strip to cover a portion of a stable mounting structure, comprising: an elongated body including a main portion, a fastener portion, a fastener receiving section, and at least one first integral portion having an outer surface that contrasts in color with an outer surface of the main portion for simulating the appearance of grout or chinking, whereby said contrasting first integral portion is exposed when the adjacent siding strip is engaged with said elongated body to simulate the appearance of grout or chinking between the adjacent strip and the elongated body.

In another example, U.S. Pat. No. 6,682,814 B1 discloses a siding assembly and method of manufacture are disclosed. U.S. Pat. No. 6,682,814 B1 states "Each siding unit is a profile of a composite material which includes a thermoplastic polymer and a cellulosic fiber. The preferred siding unit has a tapered thickness and a convex face. Each siding unit is interconnected to adjacent siding units with a tongue and groove mechanism. The preferred siding profile has a plurality of webs, and the exposed portion of the siding has a capstock layer to improve weatherability. The exposed width of the siding's face may be adjustable. The siding units are interconnected end-to-end by inserts which are positioned by means of an adhesive or thermal welding."

In another example, U.S. Pat. No. 7,331,270 B2 discloses a non-metallic armor article comprising a pultruded housing having disposed therein at least one dry ballistic impact resistant broad goods sheet secured by the pultruded housing, the housing formed from a cured, fiber impregnated resin, opposing faces of said broad goods sheet being spaced from said housing and edge portions of said broad good sheet being in contact with said housing and fixed in position with respect thereto, said housing extending around a cross-section of said broad goods sheet remote from said edge portions and being integrally formed.

In another example, U.S. Pat. No. 7,482,038 discloses an in-line process for forming prefinished siding manufactured from cellular polyvinylchloride comprising embossing, milling, parting, punching and coating the polyvinylchloride such that the resulting siding is suited for use in an environment exposed to a wide range of fluctuating temperatures and moisture.

In another example, U.S. Pat. No. 7,638,187 B2 discloses a composite comprising: a fiber having a lumen with voids; a suspension drawn into the lumen to beneficiate the fiber, the suspension including a chemical blowing agent; and a polymeric material imbedded with the fiber; whereby the natural voids of the lumen are preserved by the suspension causing the fiber to maintain natural density and strength characteristics.

In another example, U.S. Pat. No. 7,749,424 B2 discloses a method of making a fenestration framing member that includes the steps of: (a) providing a core having a cross section and a lengthwise geometry desired for said fenestration framing member, (b) placing a fiberglass mat around said core to form a fiberglass-enclosed core, and (c) vacuum infusing resin into said mat to form a fenestration framing member of desired cross section and lengthwise geometry that includes fiberglass-reinforced resin enclosing said core, wherein said step (c) includes: (c1) placing a peel ply around said fiberglass-enclosed core, (c2) placing a flow medium over said peel ply, (c3) placing tubing over said flow medium, said tubing having apertures, said tubing comprises a spiral wrap of plastic ribbon having said apertures as spiral apertures formed by gaps between wraps of said ribbon, (c4) placing the product of said step (c3) into a vacuum enclosure, (c5) connecting said tubing to a vacuum source and a source of resin to draw resin into said vacuum enclosure and infusing the resin through the apertures in said tubing, through said flow medium and said peel ply into said fiberglass mat, (c6) removing said vacuum enclosure, and (c7) removing said tubing, said flow medium and said peel ply leaving said fenestration framing member.

In another example, U.S. Pat. No. 7,776,399 discloses a method for forming a polyurethane coated cellular polyvinylchloride board.

In another example, U.S. Pat. No. 8,053,528 B2 discloses an aqueous binder composition for use in making fiber mats, the binder composition comprising: a urea-formaldehyde resin; and an aqueous emulsion of a copolymer prepared by polymerization of a mixture comprising about 20 wt % to about 60 wt % styrene, about 20 wt % to about 50 wt % of an alkyl (meth)acrylate, about 5 wt % to about 30 wt % acrylonitrile, and about 1 wt % to about 15 wt % of an unsubstituted or substituted acrylamide, where all weight percents are based on a total weight of the mixture.

In another example, U. S. Patent Application US20030021915A1 discloses cellulose-polymer composites characterized by the cellulose component being thoroughly encapsulated by the polymer component, varying density which allows high strength over a wide range of temperatures and generally low weight are provided. Composites may be extruded or coextruded into a variety of products including wood-like decking materials with natural wood coloring and texture. Processes related to the manufacture of the composites are also provided.

In another example, U. S. Patent Application US20040009338A1 discloses polymeric building materials . . . which include a composite reinforcement comprising continuous filaments of fibers substantially oriented in at least a first direction within a polymeric matrix. The composite reinforcement includes a higher tensile strength and a lower rigidity than aluminum. The building material further includes a capstock polymeric material disposed substantially over the composite reinforcement. The building material is resistant to heat deformation and corrosion. This invention also includes methods for constructing such polymeric composite building materials, including in the preferred embodiments, pultrusion and extrusion steps.

In another example, U. S. Patent Application US20040048055A1 discloses a synthetic wood structural member, comprising: a synthetic wood body comprising a synthetic polymer, the synthetic wood body having a longitudinal axis; at least one continuous fiber composite reinforcing rod element positioned within the synthetic wood body to increase the stiffness of the synthetic wood structural member, the at least one continuous fiber composite reinforcing rod element having a longitudinal axis, the longitudinal axis of the at least one continuous fiber composite reinforcing element being essentially parallel to the longitudinal axis of the synthetic wood structural member."

In another example, U. S. Patent Application US20060103045A1 discloses a method for incorporating wet use chopped strand glass (WUCS) in a screw extrusion process is provided. A polymeric resin is added to an extruder in a polymer feed zone and conveyed to a first compression zone where the resin is at least partially melted. The molten resin is conveyed to a high volume zone where WUCS fibers are added. In the high volume zone, the flights of the screw may have a greater pitch to facilitate the introduction of the WUCS into the extruder. The molten resin/fiber mixture is conveyed to a second compression zone where the resin and fibers are intimately compounded. Next, the molten resin/fiber mass is conveyed to a low pressure zone where moisture evaporated from the fibers is released through an opening. The resin/fiber mixture is then conveyed through a compression/die feed zone to further compound and mix the resin and fibers.

In another example, U. S. Patent Application US20060234028A1 discloses a process for manufacturing composite sheets, in which: a web of yarns, in the form of a mat of continuous yarns, a woven, a knit or an assembly of continuous non-interlaced yarns, is continuously deposited on a moving substrate, this web comprising at least one organic material and at least one reinforcing material; a powder of an organic material capable of forming a coating layer under the action of heat is deposited on at least one side of said web; the web coated with the powder is heated to a temperature sufficient to melt the powder; the web is compressed and cooled so as to form a composite strip; and the strip is cut in the form of sheets or wound up on a rotating support.

In another example, U. S. Patent Application US20070009688A1 discloses a reinforcement backing for cladding comprising: about 30 to about 98% by weight of at least one thermoplastic bonding material; and about 2 to about 70% by weight dried wet reinforcement fibers having a melting point that is above the melting point of said thermoplastic bonding material.

In another example, U. S. Patent Application US20070078191A1 discloses a composition for forming a reinforced composite siding product and a composite siding product formed by an extrusion process utilizing the composition is provided. The mixed resin formulation utilized to form the composite siding product includes a polymeric resin, a filler, a processing aid, at least one lubricant, and a thermal stabilizer. In a preferred embodiment, the polymer resin is polyvinyl chloride and the filler is talc. The mixed resin formulation may be extruded with a reinforcement material in a screw extrusion process to form a composite siding product. One or more reinforcing fibers may be utilized in the extrusion process. The reinforcement fibers may be present in the final product in an amount up to 25% by weight of the final product. In at least one preferred embodiment, the reinforcement fibers are glass fibers. A weatherable cap may be co-extruded to form the final reinforced, foamed composite siding product.

In another example, U. S. Patent Application US20080182074A1 discloses a melt bonded multilayer composite comprising: (a) at least one layer of a thermoplastic elastomer composition comprising (i) from about 50 to about 100 percent by weight of a thermoplastic elastomer based on the total weight of the composition, and (ii) from about 0 to about 50 percent by weight of an adhesion promoter based on the total weight of the composition; and (b) at least one layer of a rigid polyvinyl chloride polymer composition.

In another example, U. S. Patent Application US20100058691A1 discloses cellular PVC siding, trim and architectural assemblies.

In another example, U. S. Patent Application US20100075104A1 discloses a process for manufacturing composite sheets based on PVC and a network of long fibers, said process comprising the following steps: dispersing PVC in powder form in said network; subjecting the dispersion to an alternating electric field with a sufficient intensity and for a sufficient time in order to distribute the powder in the network; and heating the dispersion under pressure until the powder forms a continuous matrix.

In another example, U. S. Patent Application US20100255248A1 discloses a process for the manufacture of a weather resistant laminate comprising the steps of providing a resin impregnated fibrous layer, curing the resin of the resin impregnated fibrous layer in a first curing step, wherein in said first curing step a contact pressure is applied to the resin impregnated fibrous layer, applying a resin coating layer on the at least partially cured resin impregnated fibrous layer, curing the resin of the resin coating layer in a separate second curing step and laminating the resin impregnated fibrous layer on at least one surface of a carrier layer before, during or after the first curing step, or laminating the cured and coated resin impregnated fibrous layer on at least one surface of the carrier layer before, during or after the second curing step.

In another example, PCT Application WO2008027363A2 discloses a method of making a fenestration framing member that includes the steps of: (a) providing a core (30 or 60) having a size and shape desired for said fenestration framing member, (b) placing a fiberglass mat (32 or 64) on said core to form a fiberglass-engaged core, and (c) vacuum infusing resin into said mat of said fiberglass-engaged core to form a fenestration framing member (28 or 68) of desired size and shape that includes fiberglass-reinforced resin engaging said core.

In another example, PCT Application WO99/24651 discloses a process for manufacture of reinforced composites . . . that allows for the direct mixing of discontinuous reinforcement such as wet chopped strands of glass fibers or continuous reinforcement such as class strands, with an aqueous suspension of a solution of polymerized polymer, such as polyvinyl chloride.

In another example, the Enduro Tuff Span Catalog Data Guide discloses a multi-layer composite material comprising three layers of continuous, straight bi-directional reinforcements sandwiched between 2 layers of embossed resin rich surface mats.

In another example, the ICC-ES/ESR-2806 Evaluation Report discloses a fiber reinforced plastic (FRP) lap siding used as exterior wall covering. The product is a pultruded polyester and glass fiber composite material.

In another example, the document located at the web site http://www.resolite.com/products/roofingandsiding/1-1-2design.html discloses a chopped strand fiberglass reinforced composite panel.

Previous attempts to improve the suitability of cellular PVC for exterior systems, in particular the resistance to temperature-induced expansion and contraction were unsuitable, in that the particular reinforcement utilized did not convey the desired resistance to temperature-induced expansion and contraction, or the bonding of the reinforcement to the cellular PVC was deficient.

The present invention solves these problems by providing a cellular PVC material that is reinforced with fibers, comprising continuous strands that are bonded to the cellular PVC. The reinforcing fibers provide resistance to temperature-induced expansion and contraction of the cellular PVC material along the direction of the fibers.

SUMMARY

In one embodiment, the present invention provides a composition comprising cellular PVC reinforced with at least one continuous fiber oriented in a first direction within the cellular PVC material, wherein the at least one continuous fiber is bonded to the cellular PVC, and wherein the at least one continuous fiber provides resistance to temperature-induced expansion and contraction along the direction of the at least one continuous fiber.

In one embodiment, the at least one continuous fiber is coated with an agent that bonds the at least one continuous fiber to the cellular PVC.

In one embodiment, the at least one continuous fiber is selected from the group consisting of co-mingled silicate based fiber and thermoplastic fiber, non-comingled silicate based fibers, non-comingled carbon based fibers and non-comingled polyamide based fibers.

In one embodiment, the at least one continuous fiber is a non-comingled silicate based fiber.

In one embodiment, the non-comingled silicate based fiber is a non-comingled glass fiber.

In one embodiment, the at least one continuous fiber is a co-mingled silicate based fiber and thermoplastic fiber.

In one embodiment, the co-mingled silicate based fiber is a glass fiber and a thermoplastic fiber.

In one embodiment, the first direction is along the direction of extrusion of the cellular PVC material.

In one embodiment, the present invention provides a method to produce a composition comprising cellular PVC reinforced with at least one continuous fiber oriented in a first direction within the cellular PVC material, wherein the at least one continuous fiber is bonded to the cellular PVC, and wherein the at least one continuous fiber provides resistance to temperature-induced expansion and contraction along the direction of the at least one fiber comprising the steps of:
- a) providing a starting mixture comprising PVC powder or pellets and a blowing agent;
- b) heating the starting mixture;
- c) extruding the starting mixture through a form;
- d) combining the extrudate with at least one continuous fiber;
- e) passing the extrudate combined with the at least one continuous fiber in to a calibration chamber, allowing the combined extrudate to form cellular PVC reinforced with at least one continuous fiber oriented in a first direction within the cellular PVC material, and allowing the cellular PVC reinforced with at least one continuous fiber oriented in a first direction within the cellular PVC material to reach its final desired dimensions as defined by the calibration chamber dimensions; and
- f) cooling the cellular PVC reinforced with at least one continuous fiber oriented in a first direction within the cellular PVC material, and cutting the cellular PVC to the desired length.

In one embodiment, the at least one continuous fiber is coated with an agent that bonds the fibers to the cellular PVC.

In one embodiment, the first direction is along the direction of extrusion of the cellular PVC material.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person of ordinary skill in the art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION

For clarity of disclosure, and not by way of limitation, the detailed description of the invention is divided into the following subsections that describe or illustrate certain features, embodiments or applications of the present invention.

Cellular PVC Suitable for Use in the Present Invention

While the present invention could utilize any polymeric matrix, the present invention is illustrated using a polymeric matrix comprising cellular PVC.

Cellular PVC may be formed by any method in the art. It is understood that the choice of the method may be influenced by factors such as the end use of the item the particular cellular PVC material will be used for. For example, the cellular PVC suitable for use in the present invention may be made according to the methods disclosed in U.S. Pat. No. 5,783,613A. Alternatively, the cellular PVC suitable for use in the present invention may be made according to the methods disclosed in U.S. Pat. No. 5,786,399A. Alternatively, the cellular PVC suitable for use in the present invention may be made according to the methods disclosed in U.S. Pat. No. 7,879,922 B2. Alternatively, the cellular PVC suitable for use in the present invention may be made according to the methods disclosed in PCT Application WO02007141647A1. Alternatively, the cellular PVC suitable for use in the present invention may be made according to the methods disclosed in United States Patent Application US20030027881A1. Alternatively, the cellular PVC suitable for use in the present invention may be made according to the methods disclosed in United States Patent Application US201000281801A1.

Figure 1:
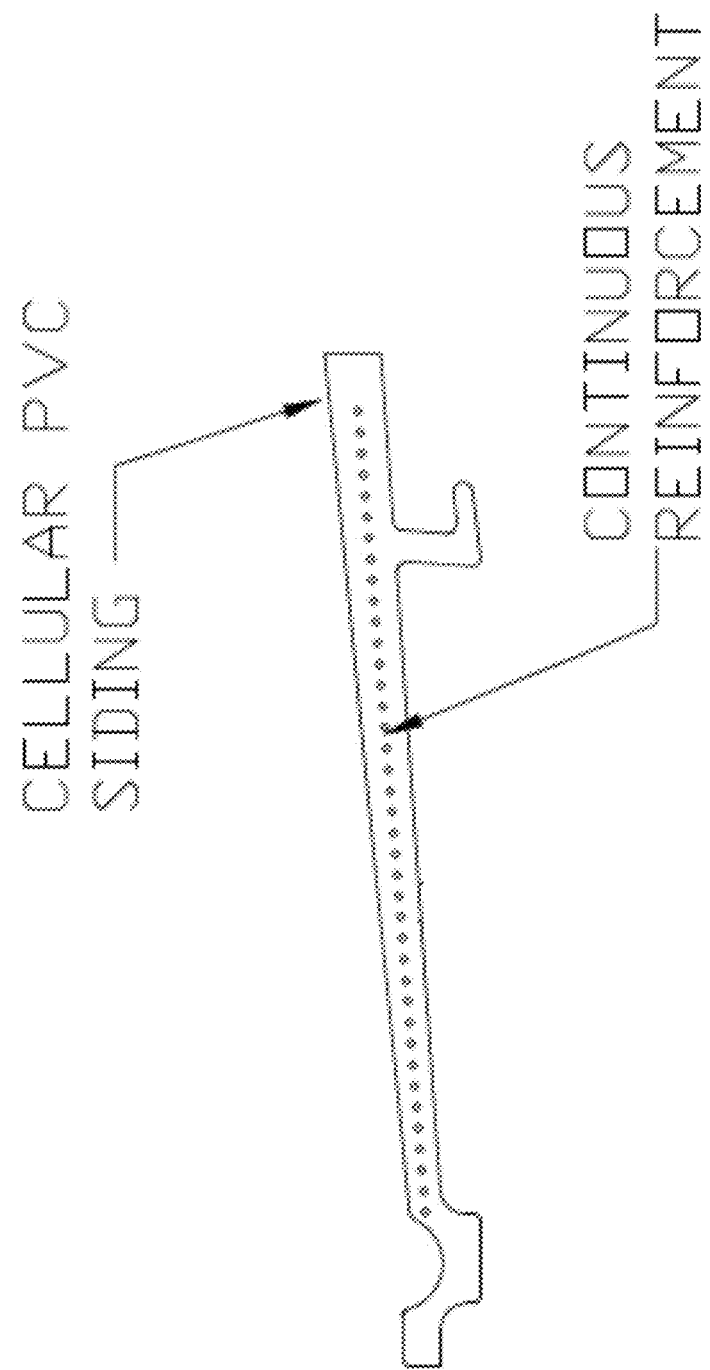
FIG. 1 shows one embodiment of the cellular PVC reinforced with at least one continuous fiber oriented in a first direction coated with an agent that bonds the fibers to the cellular PVC of the present invention, wherein the fibers are provided as separate strands and are aligned along the direction of extrusion and are distributed in a single layer within the cellular PVC.
Figure 2:
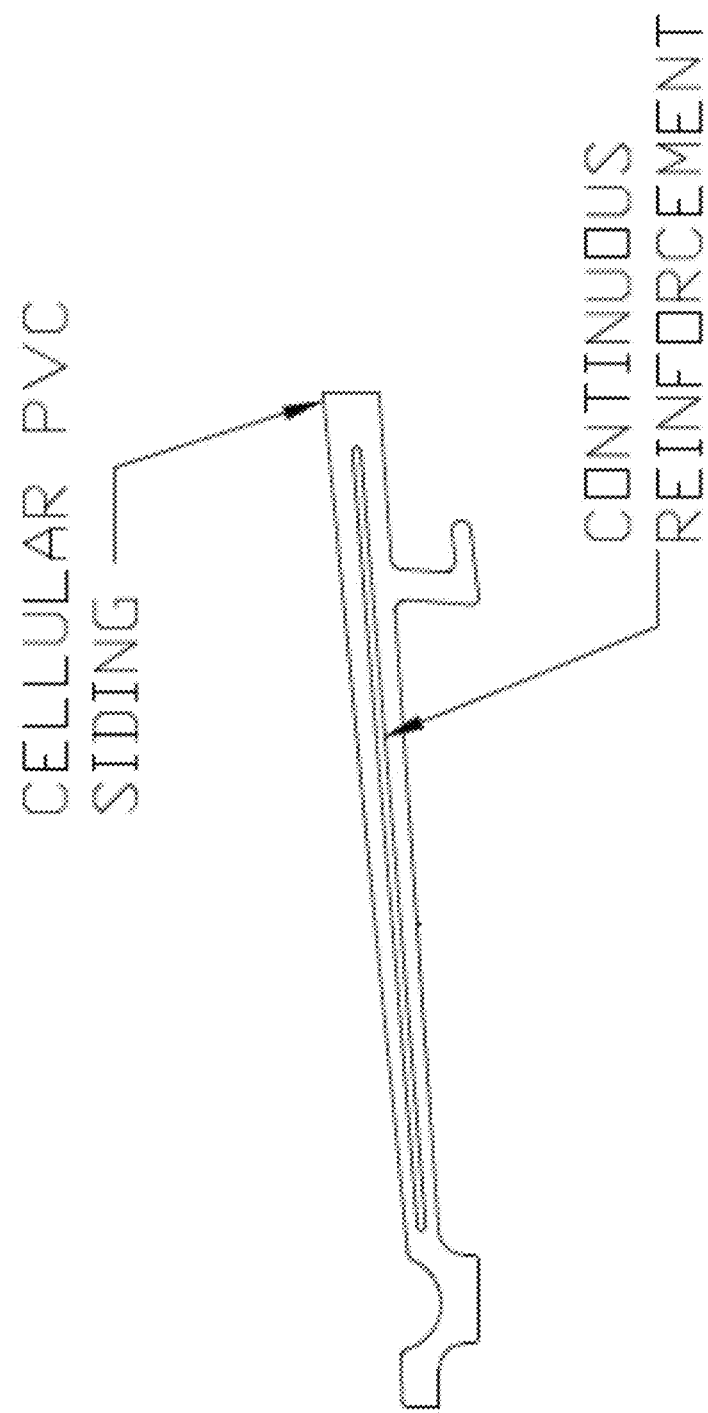
FIG. 2 shows an alternate embodiment of the cellular PVC reinforced with at least one continuous fiber oriented in a first direction coated with an agent that bonds the fibers to the cellular PVC of the present invention, wherein the fibers are provided in the form of a tape and are aligned along the direction of extrusion and are distributed in a single layer within the cellular PVC.
Figure 3:
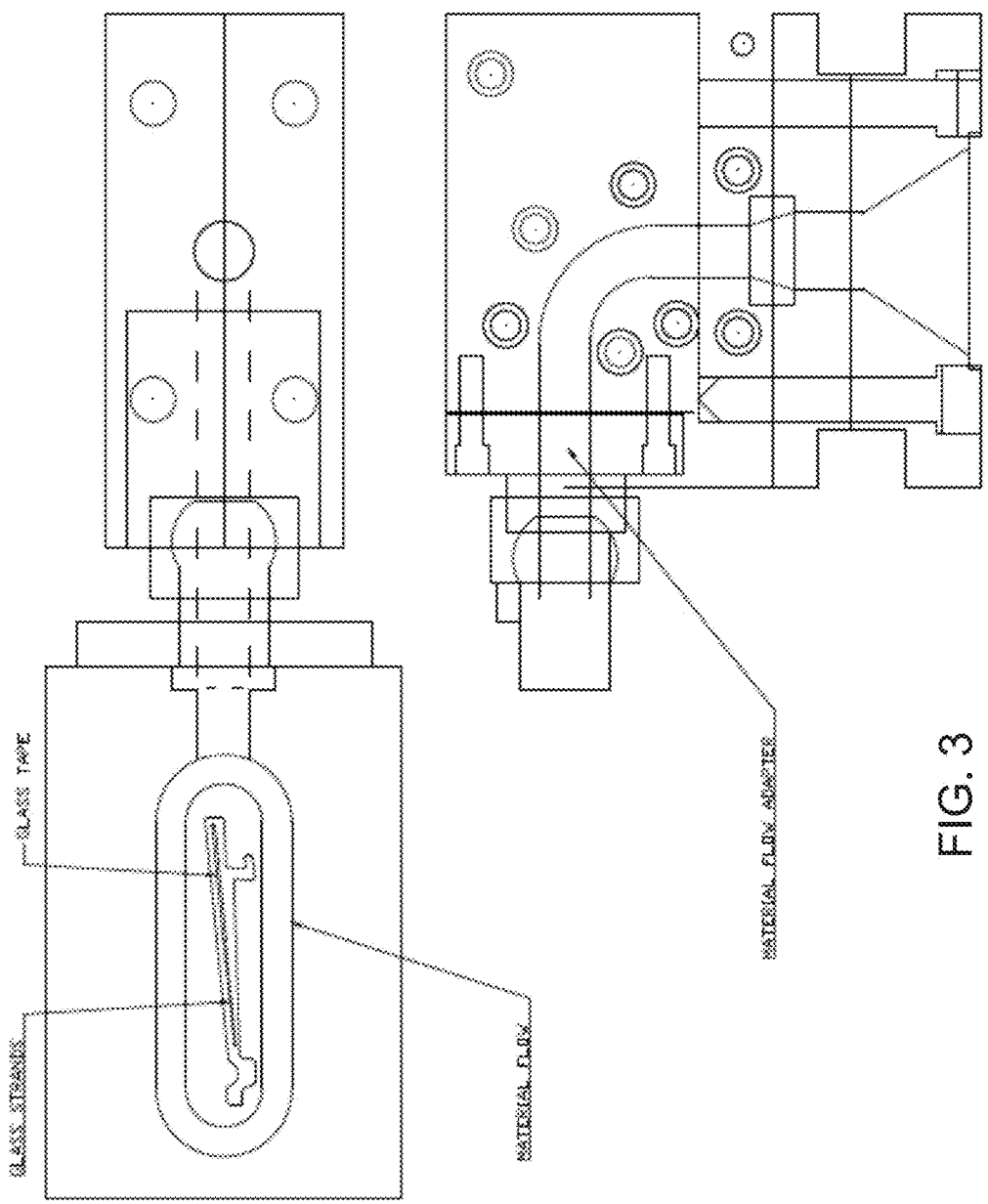
FIG. 3 shows one embodiment of the apparatus used to manufacture the cellular PVC reinforced with at least one continuous fiber oriented in a first direction coated with an agent that bonds the fibers to the cellular PVC of the present invention, wherein the fiber reinforced cellular PVC material is extruded at right angles to the direction in which the starting PVC material is added. This method is known as the "crosshead method".
Figure 4:
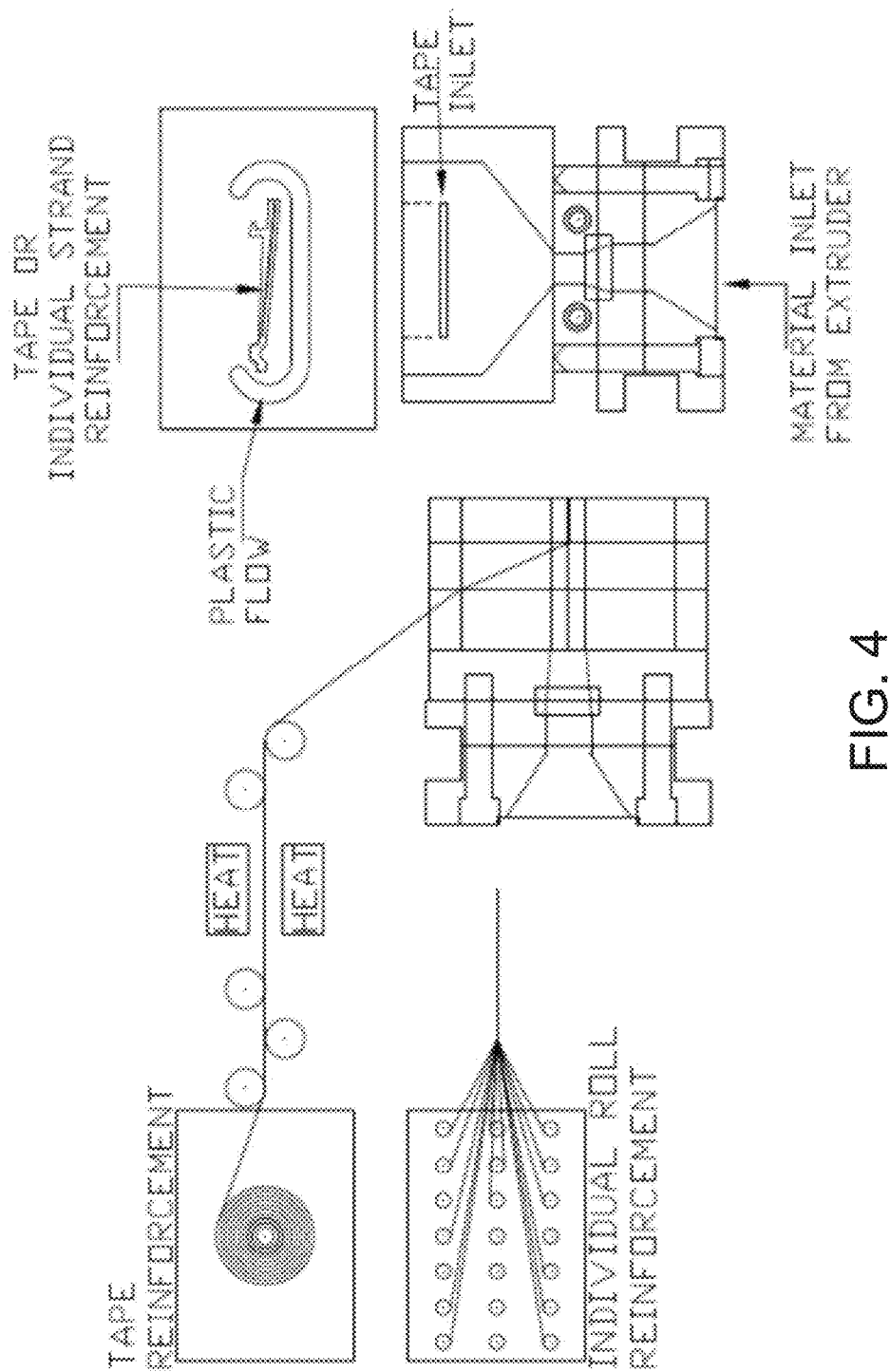
FIG. 4 shows an alternate embodiment of the apparatus used to manufacture the cellular PVC reinforced with at least one continuous fiber oriented in a first direction of the present invention coated with an agent that bonds the fibers to the cellular PVC, wherein the fiber reinforced cellular PVC material is in line to the direction in which the starting PVC material is added. This method is known as the "non crosshead method".

In one embodiment, the present invention employs a starting material consisting of PVC powder or pellets and a blowing agent. In one embodiment the blowing agent comprises from about 0.4 to about 20% of the starting material. In an alternate embodiment, the blowing agent comprises from about 4 to about 5% of the starting material. The starting material is then extruded through a die (such as, for example, the dies shown in either FIG. 3 or FIG. 4). The at least one continuous fiber is then added to the extrudate. The at least one continuous fiber may be added to the extrudate using a crosshead method. Alternatively, the at least one continuous fiber may be added to the extrudate using a non crosshead method.

In one embodiment, the extrusion process orients the at least one continuous fiber in a first direction. In one embodiment, the first direction is the direction in which the cellular PVC is extruded.

The extrudate containing the at least one continuous fiber oriented in a first direction is then passed into a calibration chamber that allows the extrudate to expand to the final desired dimensions and bonds the at least one continuous fiber oriented in a first direction to the cellular PVC material.

One of ordinary skill in the art would appreciate that the speed at which the cellular PVC material is extruded, the temperature at which the material is extruded, the shape and dimensions of the form through which the starting material is extruded, the shape and dimensions of the calibration chamber, and the temperature and pressure at which the die and calibration chamber is maintained can influence the final properties of the cellular PVC material of the present invention. For example, one, or more than one of the parameters can be altered to influence the strength of the bonding of the at least one continuous fiber to the cellular PVC. Alternatively, one, or more than one parameter may be altered to influence the density of the cellular PVC material, and the like.

In one embodiment, the at least one continuous fiber is coated with an agent that bonds the at least one fiber to the cellular PVC. In one embodiment, the agent that bonds the at least one continuous fiber to the cellular PVC of the present invention is coated on the at least one continuous fiber prior to addition to the cellular PVC material. Depending on the agent used, the agent may require activation prior to addition to the cellular PVC in order for it to bond. Again, depending on the agent used, the activation may be via pressure, heat, chemical means, and the like. In one embodiment, the present invention utilizes a heat activated bonding agent.

In one embodiment, utilizing a heat activated bonding agent, the at least one continuous fiber oriented in a first direction coated with an agent that bonds the fibers to the cellular PVC of the present invention is pre heated prior to addition to the extrudate. In one embodiment, the at least one continuous fiber oriented in a first direction coated with an agent that bonds the fibers to the cellular PVC of the present invention is pre heated to a temperature from about 330° F. to about 480° F. In an alternate embodiment, the at least one continuous fiber oriented in a first direction coated with an agent that bonds the fibers to the cellular PVC of the present invention is pre heated to a temperature from about 380° F. to about 400° F.

In one embodiment, the extrudate to which the at least one continuous fiber oriented in a first direction coated with an agent that bonds the fibers to the cellular PVC of the present invention is at a temperature from about 320° F. to about 380° F. In an alternate embodiment, the extrudate to which the at least one continuous fiber oriented in a first direction coated with an agent that bonds the fibers to the cellular PVC of the present invention is at a temperature from about 340° F. to about 370° F.

In one embodiment, the die is maintained at a pressure of about 1500 psi to about 7000 psi. In an alternate embodiment, the die is maintained at a pressure of about 1500 psi to about 2000 psi.

In one embodiment, the extrudate passes into a calibration chamber, which allows for the expansion of the cellular PVC material to the desired dimensions, as defined by the calibration chamber dimensions.

In one embodiment, the cellular PVC reinforced with at least one continuous fiber oriented in a first direction coated with an agent that bonds the fibers to the cellular PVC of the present invention is extruded at a rate of about 0.1 feet per minute to about 50 feet per minute. In an alternate embodiment, the cellular PVC reinforced with at least one continuous fiber oriented in a first direction coated with an agent that bonds the fibers to the cellular PVC of the present invention is extruded at a rate of about 5 feet per minute to about 10 feet per minute.

In one embodiment, the cellular PVC reinforced with at least one continuous fiber oriented in a first direction coated with an agent that bonds the fibers to the cellular PVC of the present invention passes from the calibration chamber to a cooling bath and is then cut to the desired length.

In one embodiment, the cellular PVC material of the present invention has a specific gravity from about 0.3 to about 1.3.

The starting material may be treated with an agent to confer an additional desired property, such as UV resistance, chemical resistance, and the like. Alternatively, the cellular PVC reinforced with at least one continuous fiber oriented in a first direction coated with an agent that bonds the fibers to the cellular PVC of the present invention may be treated with an agent to confer an additional desired property, such as UV resistance, chemical resistance, and the like.

Fiber Reinforcement Suitable for Use in the Present Invention

Fibers suitable as reinforcement in the present invention include, for example, glass fibers, carbon fibers, aramid fibers, polyester fibers or natural fibers, and the like. The selection of the particular fiber is readily made by one of ordinary skill in the art, and may be influenced by factors, such as, for example, the particular exterior application that the cellular PVC item is intended, the weight of the item, and the like. The fiber provides the rigidity required to provide resistance to temperature-induced expansion and contraction of the cellular PVC material. There can be one, or more than one fiber in the cellular PVC material. The at least one continuous fiber used as reinforcement in the present invention are continuous, unbroken fibers that run the entire length of the cellular PVC material.

In one embodiment, the at least one continuous fiber suitable as reinforcement in the present invention is a non-comingled glass fiber. The non-comingled glass fiber can be an electrical grade glass fiber, or E-glass fibers. Alternatively, the non-comingled glass fiber can be S-glass fibers. The choice of glass fiber is readily selected by one of ordinary skill in the art, and may be influenced by factors such as the desired tensile strength, wet out properties, and the like.

In one embodiment, the at least one continuous fiber is a roving consisting of strands of non-comingled unidirectional glass fibers.

In an alternate embodiment, the at least one continuous fiber is a tape consisting of strands of non-comingled unidirectional glass fibers.

In one embodiment, the at least one continuous fiber suitable as reinforcement in the present invention is a co-mingled glass and thermoplastic fiber. The choice of co-mingled fiber is readily selected by one of ordinary skill in the art, and may be influenced by factors such as the desired tensile strength, wet out properties, and the like.

In one embodiment, the at least one continuous fiber is a roving consisting of strands of co-mingled unidirectional fibers.

In an alternate embodiment, the at least one continuous fiber is a tape consisting of strands of co-mingled unidirectional fibers.

The directional orientation of the at least one continuous fiber, and the spatial distribution of the at least one continuous fiber within, or on the cellular PVC material can readily be chosen by one of ordinary skill in the art to provide resistance to temperature-induced expansion and contraction of the cellular PVC material.

For example, in one embodiment, the at least one continuous fiber is oriented in a first direction in the cellular PVC material. In one embodiment, the first direction is longitudinal. In one embodiment, the first direction is aligned with the direction of extrusion of the cellular PVC material.

In one embodiment, the at least one continuous fiber is embedded as a single layer within the cellular PVC material. In an alternate embodiment, the at least one continuous fiber is embedded as more than one layer within the cellular PVC material. The direction of orientation of the more than one layers may all be the first direction. Alternatively, the direction of orientation of the more than one layers may comprise the first layer having a first orientation, followed by the subsequent layers having another orientation.

In one embodiment, the at least one continuous fiber is embedded within the cellular PVC material. In an alternate embodiment, the at least one continuous fiber is affixed to the outside of the cellular PVC material.

In one embodiment, the at least one continuous fiber is bonded to the cellular PVC material. In one embodiment, the bonding is achieved by a bonding agent. In one embodiment, the bonding agent is applied as a coating on the at least one continuous fiber. The choice of bonding agent is readily selected by one of ordinary skill in the art, but must form a bond between the at least one continuous fiber and the cellular PVC material sufficiently strong enough to provide resistance to temperature-induced expansion and contraction along the direction of the at least one fiber. In one embodiment, the bonding agent is polybutylene terephthalate.

Exterior Systems

The fiber reinforced cellular PVC material of the present invention may be used for any exterior system, such as, for example, siding, trim moldings, door frames, window frames, decking and the like. In one embodiment, the fiber reinforced cellular PVC material of the present invention is used to manufacture siding.

The fiber reinforced cellular PVC material of the present invention may be used to form siding of any shape and dimension, limited only by the limitations of the apparatus used in the manufacture process. For example, the fiber reinforced cellular PVC material of the present invention may be used to form siding consisting of a single strip. Alternatively, the fiber reinforced cellular PVC material of the present invention may be used to form siding comprising a profile resembling more than one strip. In the embodiments where the profile resembles more than one strip, the profile may resemble two, or, alternatively, three or more single strips of siding, for example.

The width of any single strip can be any suitable width, for example, 4 inches wide, 6 inches, 7 inches wide, or any dimension that is suitable for the situation where the siding is to be installed, and each profile, being one or more strips. One of skill in the art will readily appreciate the need for building materials of various shapes, sizes and thicknesses and the desirability and potential for having such shapes, sizes and thicknesses manufactured as such or assembled or fastened after manufacture of alternate shapes, sizes and thicknesses.

For example, the fiber reinforced cellular PVC material of the present invention may be used to form siding of the shape disclosed in United States Patent Application US20100215907A1. Alternatively, the fiber reinforced cellular PVC material of the present invention may be used to form siding of the shape disclosed in United States Patent Application US20100058691A1. Alternatively, the fiber reinforced cellular PVC material of the present invention may be used to form siding of the shape disclosed in U.S. Pat. No. 6,526,718 B2.

The present invention is further illustrated, but not limited by, the following examples.

EXAMPLES

Example 1: Evaluation of the Stability of Siding Material Formed from the Cellular PVC Material of the Present Invention to Temperature Extruded siding was formed using the cellular PVC material of the present invention, wherein the at least one continuous fiber comprised glass tape obtained from Cyclics Corporation. The extruded siding containing the at least one continuous fiber comprising glass tape was exposed to a temperature of −10° C. for one hour and the length of the material were recorded at three separate locations. The extruded siding containing the at least one continuous fiber comprising glass tape was allowed to return to room temperature (20° C.) and the length of the material were recorded at three separate locations. The extruded siding containing the at least one continuous fiber comprising glass tape was then heated to 60° C. for one hour, and the length of the material were recorded at three separate locations. The extruded siding containing the at least one continuous fiber comprising glass tape was then heated to 65° C. for one hour, and the length of the material were recorded at three separate locations. The extruded siding containing the at least one continuous fiber comprising glass tape was allowed to return to room temperature (20° C.) and the length of the material were recorded at three separate locations. Parallel measurements were taken in cellular PVC material lacking any fiber reinforcement. The results are shown in Table 1.

| Sample | Room Temperature Length | Freezer Length | 60° C. Oven Length | 65° C. Oven Length | Final Length |
|---|---|---|---|---|---|
| No reinforcement | 30 in | 30 in | 30 in | 29⅝ in | 29⅝ in |
| | 76 cm | 76 cm | 76 cm | 75.5 cm | 75.4 cm |
| | 77 cm | 77 cm | 77 cm | 76.5 cm | 76.4 cm |

-continued

| Sample | Room Temperature Length | Freezer Length | 60° C. Oven Length | 65° C. Oven Length | Final Length |
|---|---|---|---|---|---|
| Reinforcement | 30 in | 30 in | 30 in | 29$^{15}$/$_{16}$ in | 29$^{15}$/$_{16}$ in |
|  | 76 cm | 76 cm | 76 cm | 75.9 cm | 75.9 cm |
|  | 77 cm | 77 cm | 77 cm | 76.9 cm | 76.9 cm |

The extruded siding containing the at least one continuous fiber comprising glass tape showed greater temperature stability at high temperatures than the extruded siding without reinforcement.

Example 2: Flow Process by which the Cellular PVC Material of the Present Invention May be Formed Step 1: Select the form profile, calibration chamber profile and build the die and extrusion apparatus that will form the cellular PVC material of the desired profile and final specific gravity, with the at least one continuous fiber reinforcement located at the desired locations.

Step 2: Prepare the starting material, including determining the correct amount of PVC, resin, fillers and blowing agent.

Step 3: Determine the amount of fiber reinforcement required for the production run.

Step 4: Preheat the fiber reinforcement and the die and extrusion apparatus.

Step 5: Extrude the starting material through the die and combine the fiber reinforcement to the extrudate.

Step 6: Allow the cellular PVC material to expand, trapping the fiber reinforcement to the cellular PVC material by passing the extrudate combined with the fiber reinforcement through the die into a calibration chamber.

Step 7: Pull the expanded cellular PVC material through a cooling bath and cut the material to the desired length.

The above steps may be repeated, varying one, or more than one of the parameters can be altered to influence the final properties of the cellular PVC material.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

What is claimed is:

1. A method to produce a composition comprising cellular PVC reinforced with at least one continuous fiber oriented in a first direction within the cellular PVC material, wherein the at least one continuous fiber is bonded to the cellular PVC, and wherein the at least one continuous fiber provides resistance to temperature-induced expansion and contraction along the direction of the at least one fiber comprising the steps of:
   a. providing a starting mixture comprising PVC powder or pellets and a blowing agent;
   b. heating the starting mixture;
   c. extruding the starting mixture through a form to produce cellular PVC;
   d. combining the cellular PVC with at least one continuous fiber coated with an agent that bonds the at least one continuous fiber to the cellular PVC so as to bond each of the at least one continuous fiber to the cellular PVC and surround each of the at least one fiber with the cellular PVC, thereby producing a fiber-reinforced cellular PVC extrudate;
   e. passing the fiber-reinforced cellular PVC extrudate in to a calibration chamber, allowing the fiber-reinforced cellular PVC extrudate to expand within the calibration chamber, thereby forming a profiled reinforced cellular PVC extrudate, wherein the profiled reinforced cellular PVC extrudate is reinforced with the at least one continuous fiber oriented in a first direction within PVC material of the profiled reinforced cellular PVC extrudate, and wherein the profiled reinforced cellular PVC extrudate has a profile that is defined by the calibration chamber dimensions;
   f. cooling the profiled reinforced cellular PVC extrudate; and
   g. cutting the profiled reinforced cellular PVC extrudate to a desired length,
   wherein the at least one continuous fiber is a co-mingled silicate based fiber and thermoplastic fiber.

2. The method of claim 1, wherein the silicate based fiber is a glass fiber.

3. The method of claim 1, wherein the first direction is aligned with the direction of extrusion of the cellular PVC material.

4. The method of claim 1, wherein the at least one continuous fiber coated with an agent that bonds the fibers to the cellular PVC is pre heated prior to addition to the cellular PVC.

5. The method of claim 1, wherein the step of combining the cellular PVC with the at least one continuous fiber is performed using a crosshead method.

6. The method of claim 1, wherein the step of combining the cellular PVC with the at least one continuous fiber is performed using a non-crosshead method.

7. The method of claim 1, wherein the starting mixture comprises between 0.4% and 20% of the blowing agent by weight.

8. The method of claim 7, wherein the starting mixture comprises between 4% and 5% of the blowing agent by weight.

9. A method to produce a composition comprising cellular PVC reinforced with at least one continuous fiber oriented in a first direction within the cellular PVC material, wherein the at least one continuous fiber is bonded to the cellular PVC, and wherein the at least one continuous fiber provides resistance to temperature-induced expansion and contraction along the direction of the at least one fiber comprising the steps of:
   a. providing a starting mixture comprising PVC powder or pellets and a blowing agent;
   b. heating the starting mixture;
   c. extruding the starting mixture through a form to produce cellular PVC;
   d. combining the cellular PVC with at least one continuous fiber coated with an agent that bonds the at least one continuous fiber to the cellular PVC so as to bond each of the at least one continuous fiber to the cellular PVC and surround each of the at least one fiber with the cellular PVC, thereby producing a fiber-reinforced cellular PVC extrudate;

e. passing the fiber-reinforced cellular PVC extrudate in to a calibration chamber, allowing the fiber-reinforced cellular PVC extrudate to expand within the calibration chamber, thereby forming a profiled reinforced cellular PVC extrudate, wherein the profiled reinforced cellular PVC extrudate is reinforced with the at least one continuous fiber oriented in a first direction within PVC material of the profiled reinforced cellular PVC extrudate, and wherein the profiled reinforced cellular PVC extrudate has a profile that is defined by the calibration chamber dimensions;

f. cooling the profiled reinforced cellular PVC extrudate; and g. cutting the profiled reinforced cellular PVC extrudate to a desired length, wherein the agent that bonds the at least one continuous fiber to the cellular PVC is polybutylene terephthalate.

10. The method of claim 9, wherein the first direction is aligned with the direction of extrusion of the cellular PVC material.

11. The method of claim 9, wherein the at least one continuous fiber coated with an agent that bonds the fibers to the cellular PVC is pre heated prior to addition to the cellular PVC extrudate.

12. The method of claim 9, wherein the step of combining the cellular PVC with the at least one continuous fiber is performed using a crosshead method.

13. The method of claim 9, wherein the starting mixture comprises between 0.4% and 20% of the blowing agent by weight.

14. The method of claim 13, wherein the starting mixture comprises between 4% and 5% of the blowing agent by weight.

15. The method of claim 9, wherein the step of combining the cellular PVC with the at least one continuous fiber is performed using a non-crosshead method.

* * * * *